United States Patent [19]
Griffin

[11] Patent Number: 5,464,214
[45] Date of Patent: Nov. 7, 1995

[54] DEVICE FOR ENHANCING THE APPEAL OF A VIDEO TERMINAL

[76] Inventor: Tom Griffin, 537 N. Myers St., Burbank, Calif. 91506-1931

[21] Appl. No.: 239,335
[22] Filed: May 6, 1994
[51] Int. Cl.⁶ ................................................. A47B 97/00
[52] U.S. Cl. ................................. 273/148 B; 312/7.2
[58] Field of Search .......................... 273/148 B, 309; 312/7.2; 434/307 R, 323

[56] References Cited

U.S. PATENT DOCUMENTS 3,294,905  12/1966  Jonassen ........................... 312/7.2 X
5,072,998  12/1991  Oh ...................................... 312/7.2 X

OTHER PUBLICATIONS

Screenies, 18971 Sonoma Hwy. Sonoma, Calif. 95476 Enclosed 6 pages publication date not known.

Primary Examiner—William H. Grieb

[57] ABSTRACT

A three-dimensional amusement device for transforming the outer appearance of a video terminal thus enhancing its appeal and improving the state of mind of the person requiring its use, particularly when that person is a child.

13 Claims, 6 Drawing Sheets

DEVICE FOR ENHANCING THE APPEAL OF A VIDEO TERMINAL

BACKGROUND OF THE INVENTION

This invention relates to amusement devices, specifically to such three-dimensional devices used to transform the outer appearance of a video terminal in order to enhance, amuse and encourage terminal use.

Since the introduction of video terminals into the workplace and home; and, subsequently into the educational process, it has become commonplace for people of all ages to be exposed regularly to their use. A video terminal typically has a video display screen and at least one input device, and often a central processing unit (CPU). Because of the video terminal's lack of attractiveness to a certain class of users, it is often perceived as intimidating and as such does not encourage its regular use. Currently there is nothing particularly appealing about a video terminal to aid in improving the state of mind of the user, even though to improve the user's state of mind is a desirable attribute, particularly when that person is a child.

While various types of three-dimensional amusement devices are known, they are essentially limited to functioning only as toys, and are not designed to enhance the attractiveness or appeal of a video terminal.

One prior attempt to improve on the aesthetics of a video display screen involves a two-dimensional artboard frame that attaches to the front of the screen using hook and loop fasteners. However, such frames are quite primitive and do not significantly transform or enhance the appeal of the video terminal with any degree of effectiveness.

Accordingly, it is contemplated that the present invention will:

(a) Enhance the appeal of a video terminal and improve the state of mind of the person requiring its use, particularly when that person is a child.
(b) Enhance the appeal of a video terminal having a video display screen and at least one input device.
(c) Permit installation by a person without the use and knowledge of special tools, fasteners, skills and instructions.
(d) Be simple and easy to use.
(e) Overcome the shortcomings of the prior art devices.

Further advantages of the invention will become apparent from a consideration of the drawings and ensuing description of it.

SUMMARY OF THE INVENTION

Accordingly, the reader will see that the device for enhancing the appeal of a video terminal is a novel, ornamental design, especially when it is a caricature of a person or animal. Other embodiments can differ in size, shape, or as caricatures of other objects, or even fantasy figures. A unifying feature of all of these embodiments described in this example is the application of the device to various types of existing video display screens, in order to improve the state of mind of the person requiring its use, particularly when that person is a child. In addition, the device of the present invention permits the user to personalize the video terminal thereby enhancing their experience.

The device can include a means for emitting sound, light or movement. Instead of stuffing a textile fabric with filler, the device can comprise a non-permeable material, such as rubber, or an extruded plastic film with gas impermeable seams and constructed such that the entire device can be pneumatically or hydraulically filled with air or Some other gas. In such an inflatable device, the inner structure can be cellular to provide internal support.

In a preferred embodiment, the present invention relates to a device for enhancing the appeal of a video terminal having a video display screen and at least one input device with a flexible skirt structure mountable to the video display screen and a three-dimensional object supported by the flexible skirt structure.

BRIEF DESCRIPTION OF THE DRAWINGS

The figures in the drawings are briefly described as follows.

DESCRIPTION OF THE PREFERRED EMBODIMENTS

Details of illustrative embodiments of the invention are set forth herein. However, it is to be understood that the embodiments describe and exemplify an invention which may take forms different from the specific embodiments disclosed. Structural and functional details are not necessarily to be interpreted as limiting, but rather as a basis for the claims.

Figure 1:
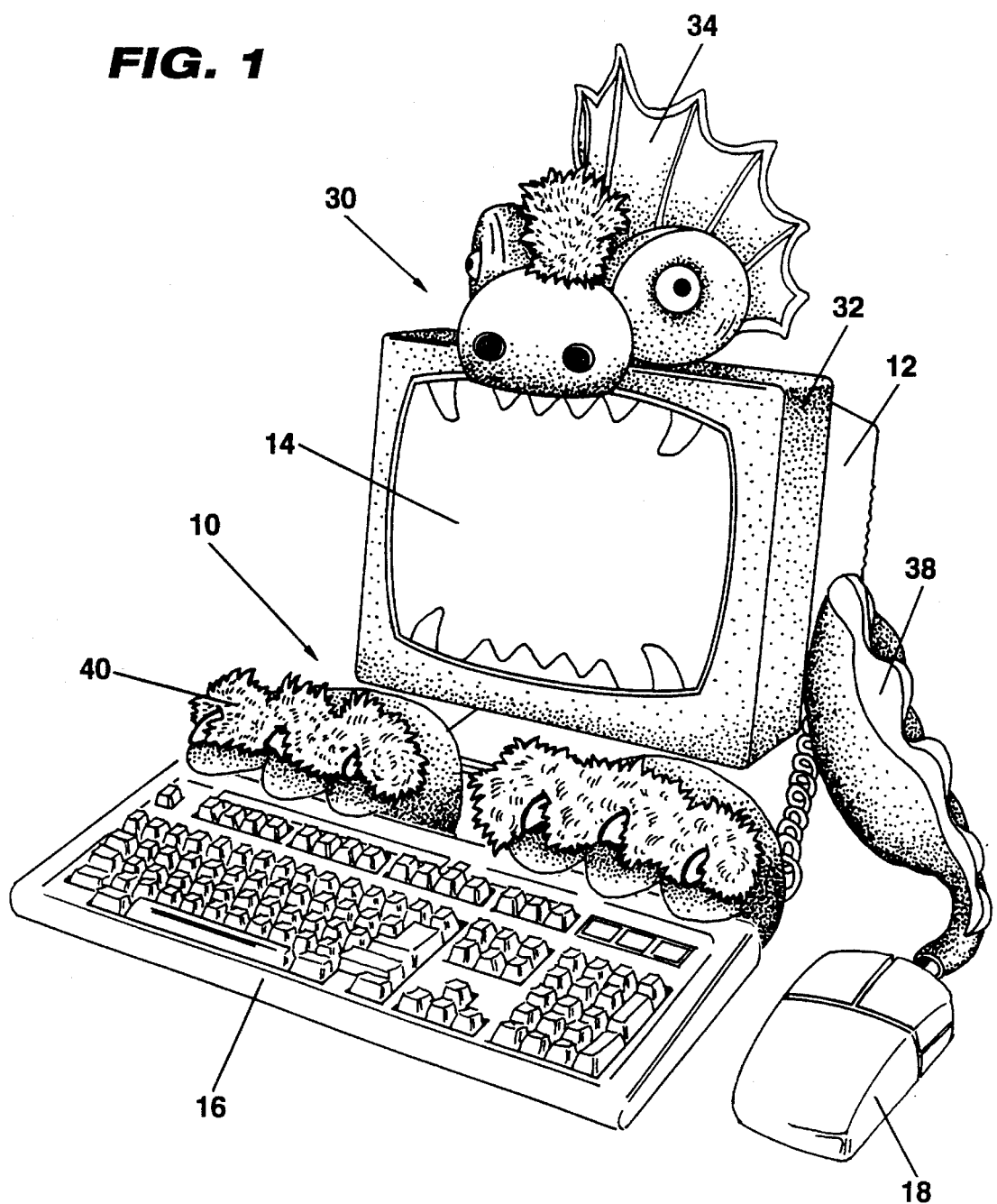
FIG. 1 is a perspective view of the first embodiment of the present invention shown installed on a video terminal.
Figure 2:
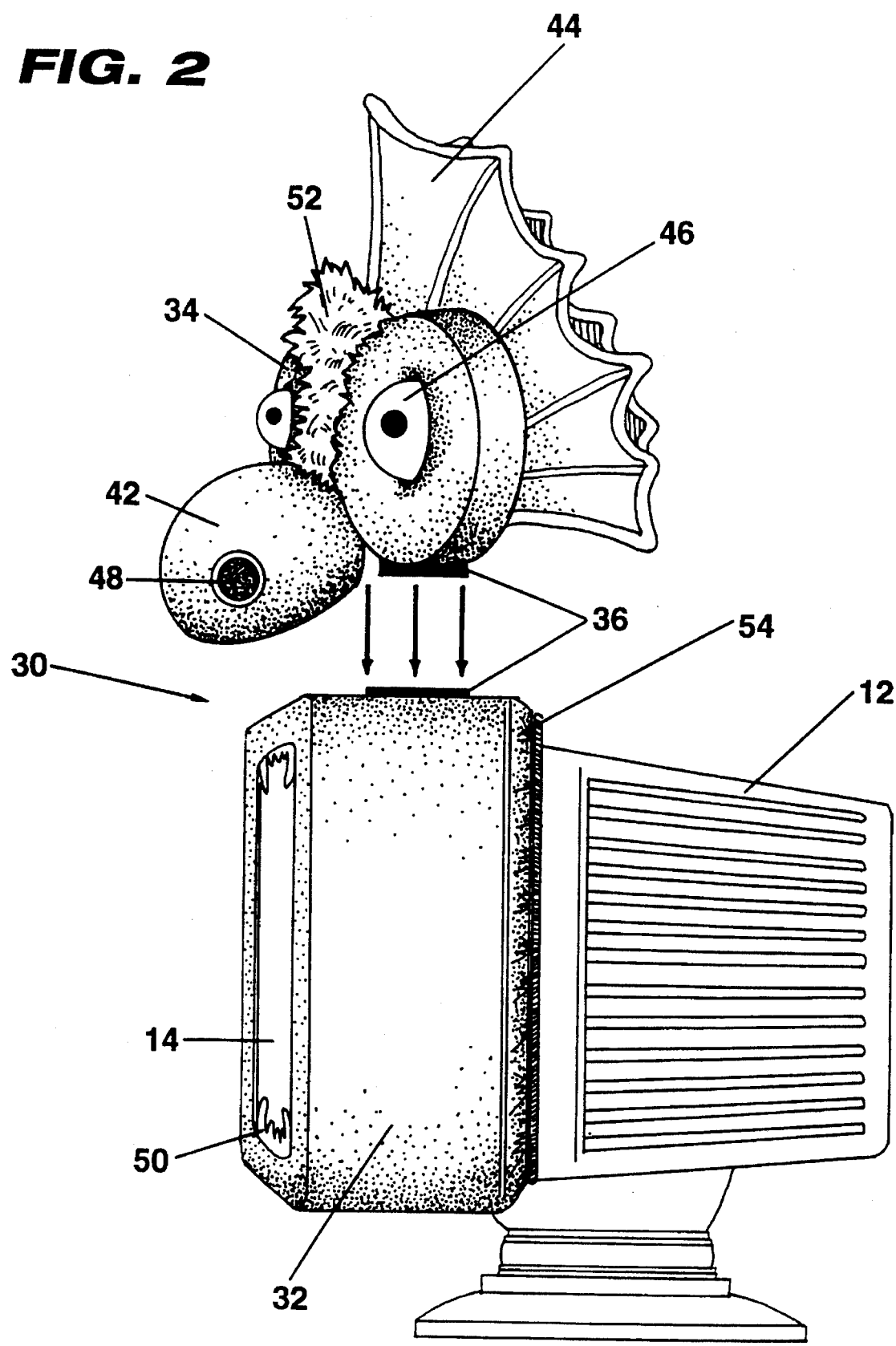
FIG. 2 is an enlarged exploded side view of the first embodiment shown installed on a video display screen.

Turning now to the drawings, in which like reference characters denote like elements throughout the several views, FIG. 1 and FIG. 2 depict a first embodiment of the invention shown installed on a video terminal. The video terminal, generally designated 10, is comprised of a video display screen 12, which has a viewing area 14, a keyboard input device 16 and a mouse input device 18, although the video terminal 10 may also include a central processing unit (CPU) and other such hardware (not shown) for accomplishing various computing functions. The device for enhancing the appeal of the video terminal, generally designated 30, is attached to the video terminal 10 in order to transform its outer appearance and enhance, amuse and encourage terminal use. In the first embodiment, the device 30 is shown as a mythical dragon but it should be noted that the device can have many embodiments, both animate or inanimate, some having additional associated appendages.

In the first embodiment of the device 30, a flexible skirt structure 32 including an annular fabric body stretchable over the video display screen 12 to surround the viewing area 14, forms the mouth portion of the dragon. The flexible skirt structure 32 supports a three-dimensional object, generally designated as 34, which in the first embodiment forms the remaining elements of the head. A releasable attachment structure 36, shown in detail in FIG. 2, attaches the three-dimensional object 34 to the flexible skirt structure 32.

In the first embodiment of the device 30, a sleeve 38, representing the tail of the dragon, is receivable over the cord of the mouse input device 18 of the video terminal 10.

Also, in the first embodiment of the device 30, a second three-dimensional object 40, representing the feet of the dragon, is positioned adjacent to the keyboard input device 16 of the video terminal 10.

Referring to FIG. 2, the flexible skirt structure 32 can be made of any desirable material, and most preferably, when the device 30 is in the form of an animal, at least made of a plush-like material to simulate skin or fur of the animal. The material should also have an elastic quality for stretching the flexible skirt structure 32 over the video display screen 12, thus accommodating the various sizes and shapes of video display screens. A sewn seam 54 enclosing an elastic strap extends along the rear opening of the flexible skirt structure 32 and helps to enclose the skirt tightly over the video display screen 12. The three-dimensional object 34, a dragon head in this embodiment, is comprised of any desirable material used for the outer case 42 provided with a soft, compressible filler material. The soft, compressible filler can be made of suitable material employed for amusement devices. The releasable attachment structure 36, shown as complementary hook and loop elements, attaches the bottom of the three-dimensional object 34 to the top of the flexible skirt structure 32. It should be understood that although complementary hook and loop elements are illustrated as the preferred releasable attachment structure 36 for device 30, other attachment structures such as buttons/holes, hook and eyes, straps, buckles, peelable adhesives, zippers, snaps, or the like, can be used.

It should be understood that the particular materials used to form the outer case 42 and the soft compressible filler do not constitute limitations on the present invention, such materials being well known to people skilled in the art of manufacturing amusement devices. The outer case 42 is formed from a plurality of discrete panels which are sewn or stitched together.

Additional decorative features can be attached to the device 30, by means and through the use of materials known to people skilled in the art of manufacturing amusement devices. In the first embodiment of the invention, eyes 46, a nose 48, fins 44, teeth 50 and feathers 52 have been added to enhance the attractiveness and appeal of the device 30. A wide-variety of decorative features could be applied to the device 30 depending upon the chosen form of embodiment.

Figure 3:
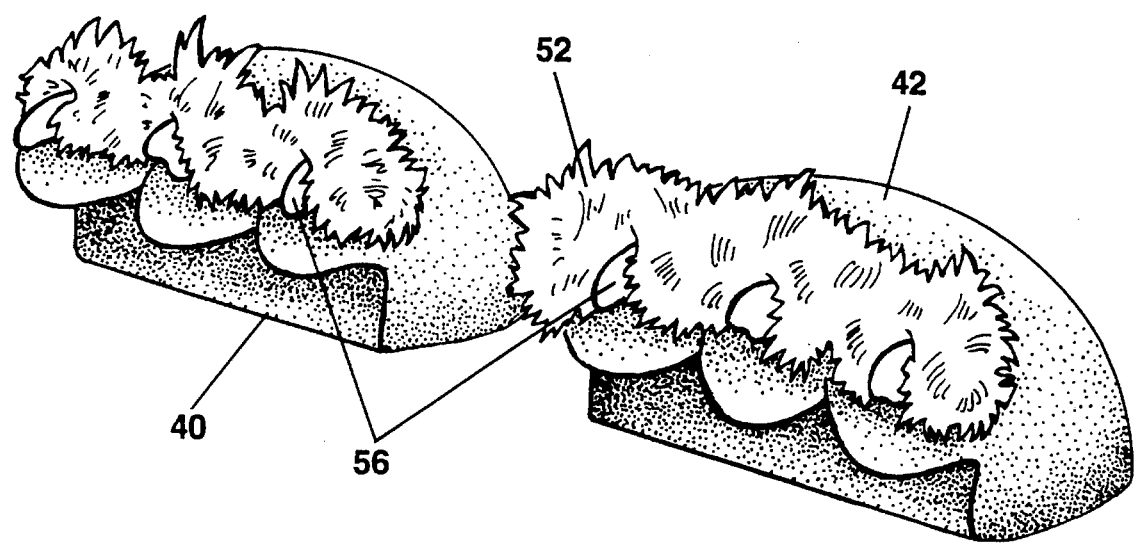
FIG. 3 is an enlarged perspective view of the feet of the first embodiment in detail.

In the first embodiment of the device 30, FIG. 3 is an enlarged perspective view of a second three-dimensional object 40, representing the feet of the dragon. The object 40, is comprised of any desirable material used for the outer case 42 provided with a soft, compressible filler material. The soft, compressible filler can be made of suitable material employed for amusement devices. The outer case 42 is formed from a plurality of discrete panels which are sewn or stitched together. In the present embodiment, the object 40, is undercut in order to create the finger/claw portion of the dragon's feet that extends over the keyboard input device 16 of the video terminal 10.

Additional decorative features can be attached to the object 40, by means and through the use of materials known to people skilled in the art of manufacturing amusement devices. In the first embodiment of the invention, claws 56 and feathers 52 have been added to enhance the attractiveness and appeal of the object 40. A wide-variety of decorative features could be applied to the object 40 depending upon the chosen form of the embodiment and the resultant form of the three-dimensional object 40.

Figure 4:
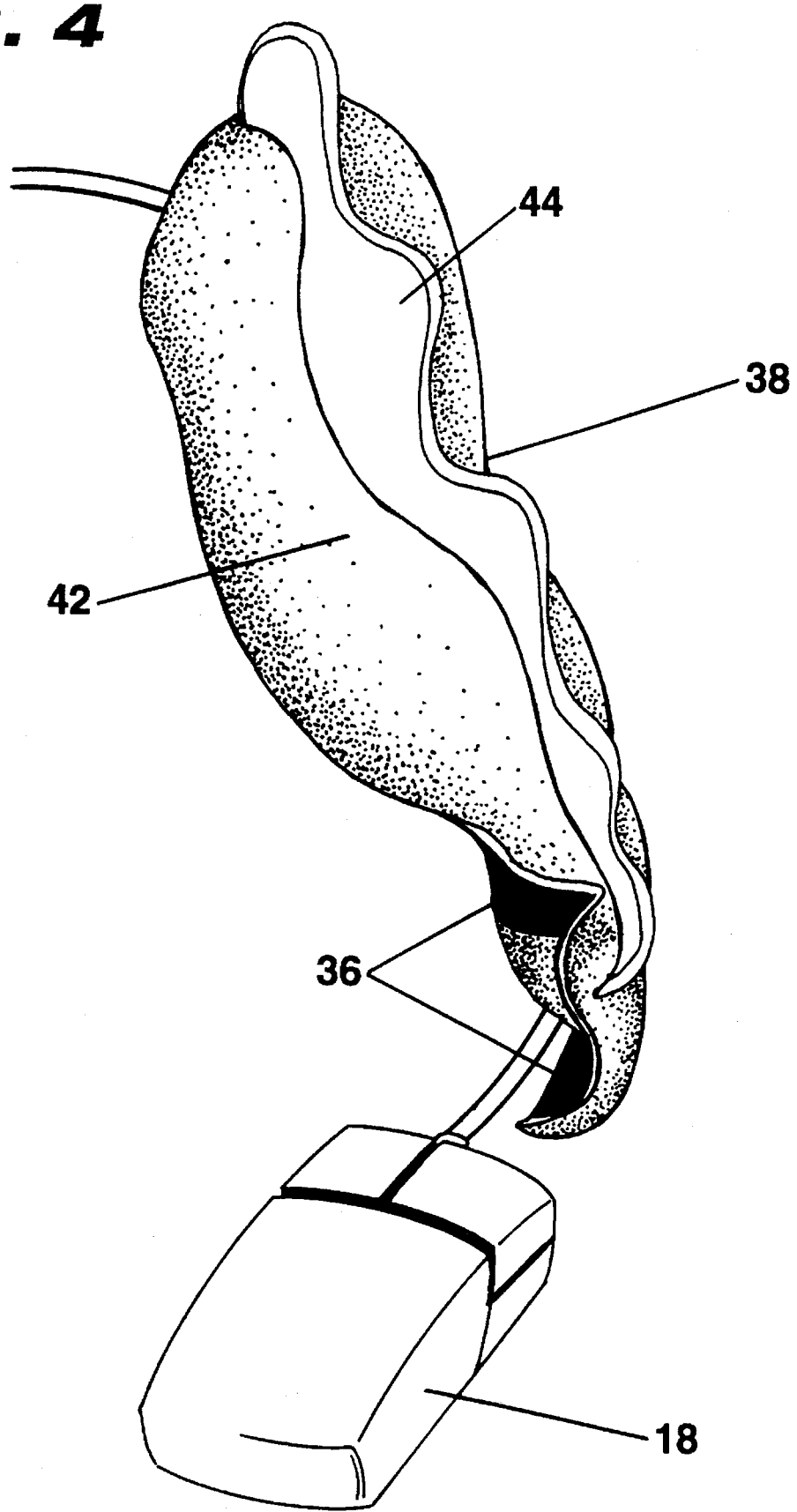
FIG. 4 is an enlarged perspective view of the tail of the first embodiment in detail.

In the first embodiment of the device 30, FIG. 4 is an enlarged perspective view of a sleeve 38, representing the tail of the dragon. The sleeve 38 has a releasable attachment structure 36 joining two opposed edges of the sleeve 38 to encompass the cord of at least one input device. In the first embodiment of the device 30, the sleeve 38 is receivable over the cord of the mouse input device 18 of the video terminal 10. As an alternative to the first embodiment, the sleeve 38 could be receivable over the cord of the keyboard input device 16, particularly when the device 30 is applied to a video terminal 10 that does not facilitate a mouse input device 18. The sleeve 38 is comprised of any desirable material used for the outer case 42 provided with a soft, compressible filler material. The soft, compressible filler can be made of suitable material employed for amusement devices. The outer case 42 is formed from a plurality of discrete panels which are sewn or stitched together. The releasable attachment structure 36, shown as complementary hook and loop elements affixed to said opposed edges of the sleeve 38, extends substantially lengthwise of said sleeve 38. Although complementary hook and loop elements are illustrated as the preferred releasable attachment structure 36 for sleeve 38, other attachment structures such as buttons/holes, hook and eyes, straps, buckles, peelable adhesives, zippers, snaps, or the like, can be used.

Additional decorative features can be attached to the sleeve 38, by means and through the use of materials known to people skilled in the art of manufacturing amusement devices. In the first embodiment of the invention, fins 44 have been added to enhance the attractiveness and appeal of the sleeve 38. A wide-variety of decorative features could be applied to the sleeve 38 depending upon the chosen form of the embodiment and the resultant form of the sleeve 38.

Finally, FIGS. 5A, 5B, 5C and 5D are front views of alternative embodiments of the device 30 shown installed on video terminals 10, wherein elements corresponding generally to elements of the first embodiments, FIGS. 1 through 4, are referenced with similar numbers having the suffix of A, B, C, or D.

Figure 5A:
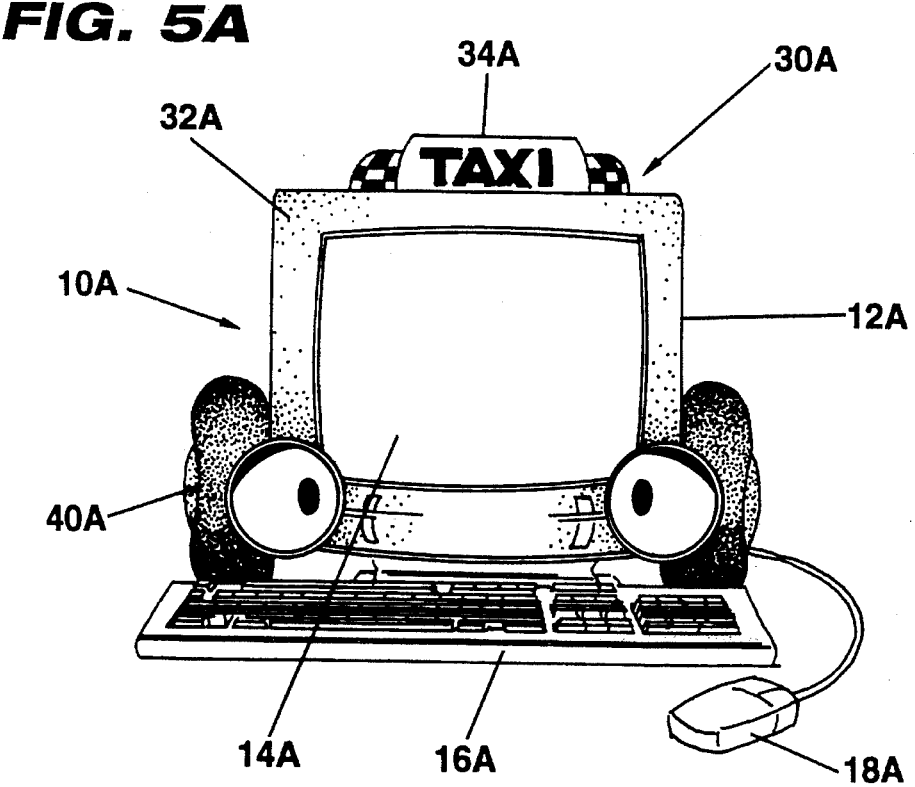
FIG. 5A, 5B, 5C, and 5D are front views of alternative embodiments of the invention shown installed on video terminals.

In FIG. 5A, the device 30A is shown as a taxi cab attached to a video terminal 10A. A flexible skirt structure 32A stretchable over the video display screen 12A to surround the viewing area 14A, forms the roof and windshield portion of the taxi cab. The flexible skirt structure 32A supports a three-dimensional object, generally designated as 34A, which forms the remaining elements of the taxi cab roof. A second three-dimensional object 40A, representing the tires, front bumper and headlights of the taxi cab, is positioned adjacent to the keyboard input device 16A of the video terminal 10A.

Figure 5B:
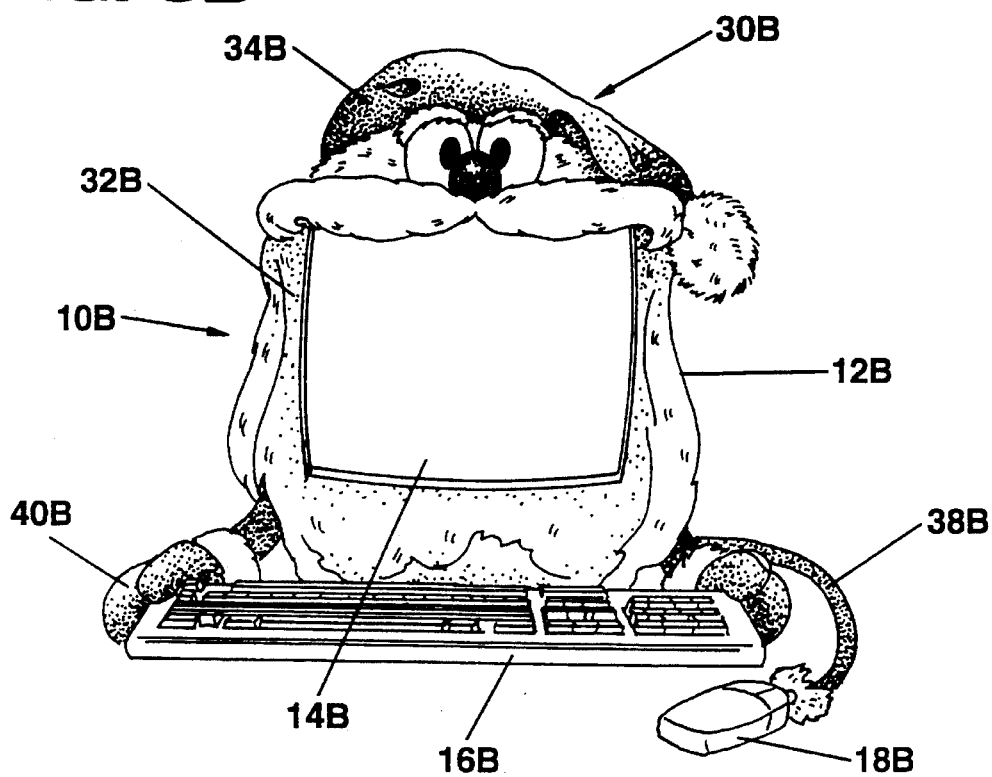

In FIG. 5B, the device 30B is shown as a Santa Claus creature attached to a video terminal 10B. A flexible skirt structure 32B stretchable over the video display screen 1ZB to surround the viewing area 14B, forms the mouth portion of the Santa Claus creature. The flexible skirt structure 3ZB supports a three-dimensional object, generally designated as 34B, which forms the remaining elements of the head. A sleeve 38B, representing the tail of the Santa Claus creature, is receivable over the cord of the mouse input device 18B of the video terminal 10B. A second three-dimensional object 40B, representing the hands of the Santa Claus creature, are positioned adjacent to the keyboard input device 16B of the video terminal 10B.

Figure 5C:
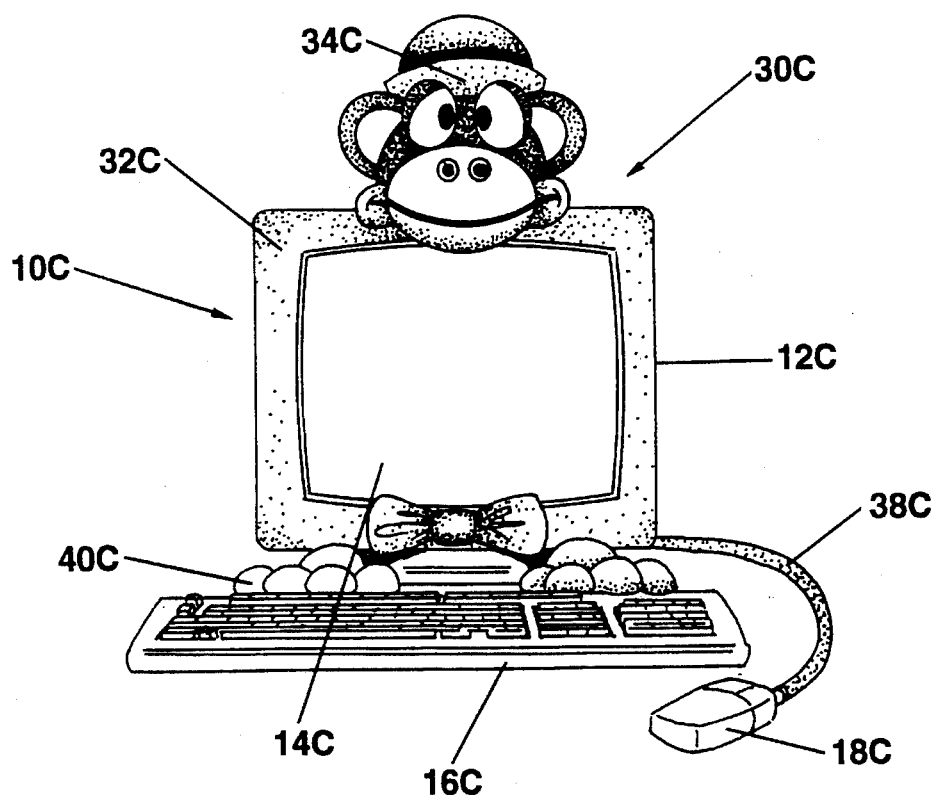

In FIG. 5C, the device 30C is shown as a monkey attached to a video terminal 10C. A flexible skirt structure 32C stretchable over the video display screen 12C to surround the viewing area 14C, forms the shoulder portion of the monkey. The flexible skirt structure 32C supports a three-dimensional object, generally designated as 34C, which forms the head of the monkey. A sleeve 38C, representing the tail of the monkey, is receivable over the cord of the mouse input device 18C of the video terminal 10C. A second three-dimensional object 40C, representing the hands of the monkey, are positioned adjacent to the keyboard input device 16C of the video terminal 10C.

Figure 5D:
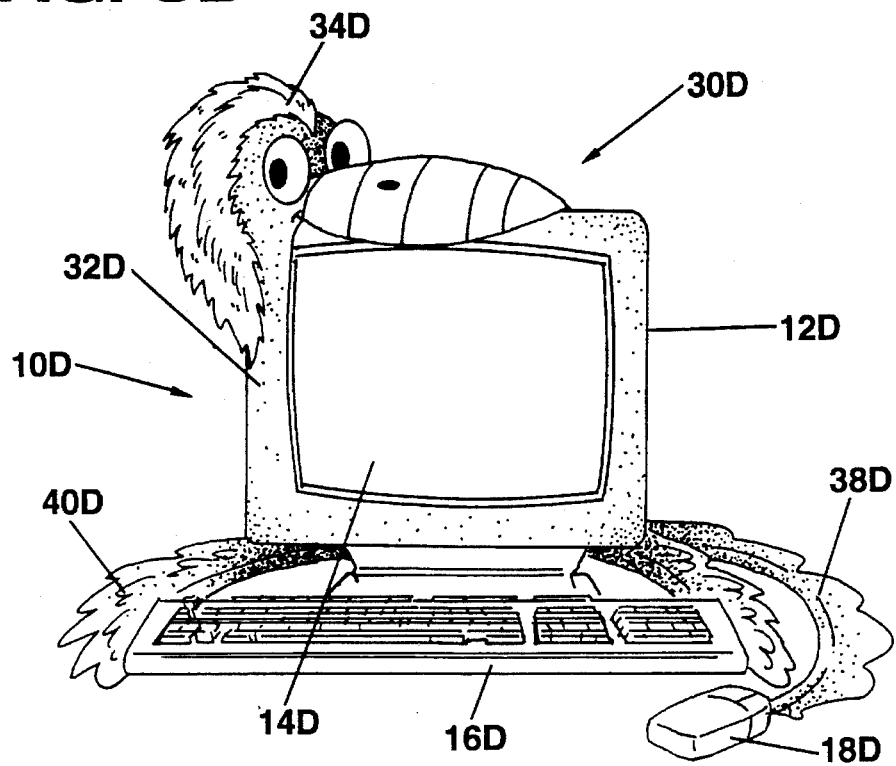

In FIG. 5D, the device 30D is shown as a bird attached to a video terminal 10D. A flexible skirt structure 32D stretchable over the video display screen 12D to surround the viewing area 14D, forms the body portion of the bird. The flexible skirt structure 32D supports a three-dimensional object, generally designated as 34D, which forms the head of the bird. A sleeve 38D, representing the tail of the bird, is receivable over the cord of the mouse input device 18D of the video terminal 10D. A second three-dimensional object 40D, representing the wings of the bird, are positioned adjacent to the keyboard input device 16D of the video terminal 10D.

In use, the device 30 is installed on a video terminal 10 by stretching the flexible skirt structure 32 around the video display screen 12, and then attaching the three-dimensional object 34 to the flexible skirt structure 32. The sleeve 38 is then used to encompass the cord of at least one input device (either 16 or 18) and the second three-dimensional object 40 is positioned adjacent to the keyboard input device 16. In this way, the video terminal 10 is transformed and greatly enhances the users computing experience.

From the foregoing description, one skilled in the art can readily ascertain the essential characteristics of the invention and, without departing from the spirit and scope thereof, can adapt the invention to various usages and conditions. Changes in form and the substitution of equivalents are contemplated as circumstances may suggest or render expedient; and although specific terms have been employed herein, they are intended in a descriptive sense and not for purposes of limitation, the purview of the invention being delineated in the following claims.

I claim:

1. A device for enhancing the appeal of a video terminal having a video display screen and at least one input device, comprising:

a stretchable (flexible) skirt structure mountable to the video display screen; and a three-dimensional object supported by the stretchable (flexible) skirt structure.

2. The device of claim 1 which further comprises: a sleeve receivable over a cord of said at least one input device.

3. The device of claim 2 wherein:

said at least one input device comprises a mouse; and the sleeve is receivable over a cord of said mouse.

4. The device of claim 2 wherein:

said at least one input device comprises a keyboard; and the sleeve is receivable over a cord of said keyboard.

5. The device of claim 2 wherein:

the sleeve has a releasable attachment structure joining two opposed edges of the sleeve to encompass the cord of said at least one input device.

6. The device of claim 5 wherein:

the releasable attachment structure extends substantially lengthwise of said sleeve.

7. The device of claim 5 wherein:

the releasable attachment structure comprises complementary hook and loop elements affixed to said opposed edges of the sleeve.

8. The device of claim 1 wherein:

the three-dimensional object is selected to appeal to a preselected class of users.

9. The device of claim 1 wherein:

the three-dimensional object represents a creature appealing to a preselected class of users.

10. The device of claim 9 which further comprises:

a sleeve receivable over a cord of said at least one input device; and the sleeve represents a tail of said creature.

11. The device of claim 1 which further comprises:

a second three-dimensional object representing feet of said creature;

said second three-dimensional object positionable adjacent a keyboard of the video terminal.

12. The device of claim 1 wherein:

the video display screen has a viewing area; and the stretchable (flexible) skirt structure comprises an annular fabric body stretchable over the video display screen to surround the viewing area.

13. A device for enhancing the appeal of a video terminal having at least one input device and a video display screen with a viewing area, comprising:

a flexible skirt structure including an annular fabric body stretchable over the video display screen to surround the viewing area;

a three-dimensional object supported by the flexible skirt structure, said three-dimensional object selected to appeal to a preselected class of users; and a sleeve receivable over a cord of said at least one input device.

* * * * *